April 7, 1953   D. P. ECKMAN   2,633,858
PROPORTIONAL RESET RESPONSE FLUID RELAY
Filed Nov. 14, 1947   3 Sheets-Sheet 1

*INVENTOR.*
DONALD P. ECKMAN
BY
*Arthur H. Swanson*
ATTORNEY

April 7, 1953  D. P. ECKMAN  2,633,858
PROPORTIONAL RESET RESPONSE FLUID RELAY
Filed Nov. 14, 1947  3 Sheets-Sheet 2

*INVENTOR.*
DONALD P. ECKMAN
BY *Arthur H. Swanson*
ATTORNEY

April 7, 1953 D. P. ECKMAN 2,633,858
PROPORTIONAL RESET RESPONSE FLUID RELAY
Filed Nov. 14, 1947 3 Sheets-Sheet 3

FIG. 6

INVENTOR.
DONALD P. ECKMAN
BY Arthur H. Swanson
ATTORNEY

Patented Apr. 7, 1953

2,633,858

UNITED STATES PATENT OFFICE 2,633,858

PROPORTIONAL RESET RESPONSE FLUID RELAY

Donald P. Eckman, Ithaca, N. Y., assignor, by mesne assignments, to Minneapolis-Honeywell Regulator Company, Minneapolis, Minn., a corporation of Delaware Application November 14, 1947, Serial No. 785,991

14 Claims. (Cl. 137—86)

The general object of the present invention is to provide improved air control apparatus characterized by the simple and effective manner in which a plurality of control action components or responses differing from one another in character, are produced and combined. More specifically, the object of the present invention is to provide an air controller including simple and effective means for producing and combining proportional, reset and second integral control responses. The second integral response obtained by the use of the invention may be described as a reset of a reset. The reset action or response is an integral, and a reset of a reset is thus an integral of an integral, or a second integral. In accordance with the present invention, I may sometimes combine proportional, reset and second integral responses with one or more other responses, and in particular with a rate response.

The use of the present invention is of especial advantage in processes subject to gradual load changes. In such a process, the addition of the second integral response to the proportional reset response makes possible the substantial elimination of a shift in the controlled variable during the period in which the load is gradually changing. In a simple form of the invention, the proportional, reset and second integral responses are obtained by a combination of three expansible air chambers in which the follow-up, reset and second integral air pressures are respectively developed. In another form of the invention, the proportional, reset and second integral pressures are respectively developed in first, second and third expansible pressure chambers of a liquid filled system, and the follow-up pressure is developed by subjecting a movable wall of the first chamber to an external air pressure. Said air pressure is subject to an initial variation on a change in the controlled variable, and is thereafter modified as a result of pressure changes in said liquid containing system. In one illustrated form of the invention, the air pressure is further modified as a result of pressure derived from pressures in one or more of said pressure chambers. In the last mentioned form of the invention, the rate response is preferably obtained by the addition to the liquid containing system of a rate responsive pressure chamber which serve to retard the follow-up action.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
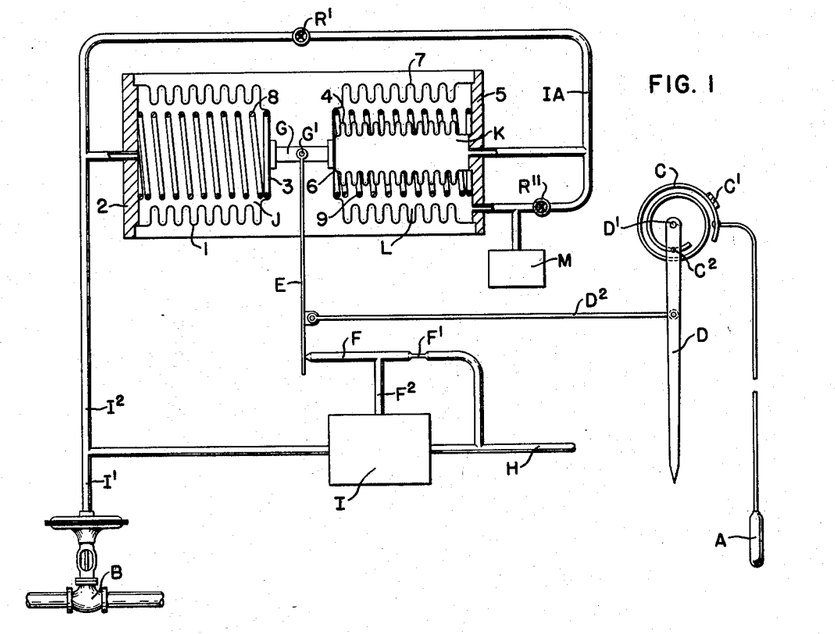
Fig. 1 is a diagrammatic representation of a control system having air filled follow-up, reset and second integral pressure chambers.

In Fig. 1, I have illustrated, by way of example, a control system for obtaining proportional, reset and second integral responses on a deviation of a controlled variable from its predetermined normal, or control point value, and a regulator actuated by said responses to restore the normal value of said variable. The controlled variable in such a system as is shown diagrammatically in Fig. 1, may be a temperature, a pressure, a velocity, or any one of many other measurable physical or chemical quantities. As shown by way of example in Fig. 1, the controlled variable is a heater temperature impressed on the bulb A of a fluid pressure thermometer, and variations in said temperature effect adjustments of a regulator B in the form of a fuel valve by which the supply of fuel to the heater is varied to restore the normal value of the heater temperature. As diagrammatically shown, the thermometer bulb pressure is transmitted to the stationary outer end C' of a Bourdon tube, shown as a spiral and having its movable end C² connected to a pen arm or other deflecting element D. The element D is pivoted at D', and is connected by a link D² to a bleed valve E. The latter is diagrammatically shown as suspended from a pivot pin G' carried by a rod or cross-bar G which extends transversely of the valve F, and is given longitudinal reciprocating movements, as hereinafter described, following a change in the thermometer bulb temperature.

A decrease or increase in the thermometer bulb temperature produces a deflection of the pen arm D in the counter-clockwise or clockwise direction, respectively. A counter-clockwise adjustment of the element D results in a counter-clockwise adjustment of the flapper valve E about its suspension pivot G', moving the valve toward the discharge end of a bleed nozzle F. The latter receives air through a restriction F' from a pipe H which supplies air at an approximately constant pressure, which may well be of the order of seventeen pounds per square inch. As the valve E is moved toward and away from the nozzle F through a small operating range, which may well be of the order of four thousandths of an inch, the pressure in the nozzle F is varied between a maximum, approximately equal to the pressure in the supply pipe H, and a minimum but little above the pressure of the atmosphere. The bleed nozzle pressure is transmitted by a pipe F² from the nozzle F to the control inlet of a pilot valve or pneumatic relay I which is connected to the supply pipe H and maintains an output pressure varying in direct proportion with said nozzle pressure. Said output pressure is transmitted through a pipe I' to the pressure chamber of the regulator B. The apparatus shown in Fig. 1 is so arranged that the decrease in the thermometer bulb temperature which increases the bleed nozzle air pressure, thereby proportionally increases the output air pressure of the pilot valve or relay I and thus gives an opening adjustment to the fuel regulator B and thereby tends to increase the heater temperature to which the bulb A responds.

The output pressure of the pilot valve or relay I is transmitted through a second pipe I² to the expansible pressure chamber J. The latter, as shown, is surrounded by a corrugated tubular bellows element 1, having one end connected to a stationary end wall 2, and having its opposite end connected to a movable end wall 3. The pipe I² is in communication with the chamber J through an opening in the end wall 2. The end wall 3 is connected to one end of the rod or cross-bar G. The other end of the rod G is connected to the common movable end wall 6 of the expansible air chambers K and L. The chamber K comprises the space surrounded by a corrugated tubular bellows element 4 having one end connected to the end wall 6 and having its other end connected to a stationary end wall 5. The chamber L comprises the inter-bellows space surrounding the bellows K and surrounded by a corrugated tubular bellows element 7 which has one end connected to the movable wall 6 and has its other end connected to the movable wall 5, and is substantially larger in diameter than the bellows element 4. As shown, the three bellows 1, 4 and 7 are coaxial and the corrugated tubular body of each is formed of spring metal.

The pipe I² is connected through a flow restricting device R' to one end of a pipe IA which has its other end in free communication with the chamber K through an opening in the end wall 5. The pipe IA is connected to the inter-bellows chamber L through a second flow restricting device R''. Preferably, each of the flow restricting devices R' and R'' is adjustable, and ordinarily it is a needle valve. To reduce the change in pressure in the chamber L produced by a change in the pressure in the pipe I², the outlet of the restriction device R'' is connected to an air reservoir M, as well as to the chamber L. When the pressures in the chambers, J, K, L and M are all equal, as they will be following a suitably prolonged stable operating condition in which the temperature of the thermometer bulb A remains constant at its normal or control point value, the bellows end wall members 3 and 6 and connecting rod G are held in predetermined normal positions by bias forces. The bias forces may be due in whole, or in part, to the resiliency of the spring metal forming the corrugated bodies of the tubular bellows elements 1, 4 and 7. In ordinary practice, however, the bias forces are largely due to helical compression springs 8 and 9. The spring 8 acts between the end walls 2 and 3 of the chamber J, and the spring 9 acts between the common end walls 5 and 6 of the chambers K and L.

In ordinary practice the apparatus shown in Fig. 1 will usually include suitable means for adjusting the proportional band or throttling range, but to simplify the illustration no such adjusting means are shown in Fig. 1. As is well known, throttling range adjustments may be effected by adjusting the leverage through which the longitudinal movements of the cross-bar G move the valve E relative to the nozzle F. One extensively used arrangement for adjusting that leverage is disclosed in the Moore Patent 2,125,081 of July 26, 1938.

In the operation of the apparatus shown in Fig. 1, a deviation in the temperature of the thermometer bulb A produces an initial change in the pressure in the bleed nozzle F, and a series of delayed subsequent changes in that pressure, assuming for example, a decrease in the thermometer bulb temperature from its normal or control point value, that pressure decrease results in a closing adjustment of the flapper valve E which is effected through the link D² and increases the pressure in the nozzle F. The nozzle pressure increase results in a corresponding increase in the output pressure of the pilot valve or relay I which is transmitted through the pipe I² to the chamber J, and causes the latter to expand and thus move the connecting rod G to the right. The expansion of the chamber J thus produced is a follow-up action, and the resultant movement to the right of the pin G' turns the flapper valve E clockwise about the point of its pivotal connection to the link D² and thereby gives an opening adjustment to the valve E. That valve adjustment is a negative feed-back or follow-up action which eliminates part of the increase in the pilot valve output pressure which had caused said expansion of the chamber J, and is a characteristic of, and essential to the attainment of a proportional control response of the apparatus to a change in the value of the controlled variable.

The increase in the pilot valve output pressure resulting from the initial decrease in the thermometer bulb temperature, results in a restricted flow of air from the pipe I² into the pipe IA through the restriction R', and a corresponding pressure drop in said restriction. As the leakage flow through the restriction R' proceeds, the pressure in the chamber K slowly builds up, and thereby gives a correspondingly slow return movement to the left of the crossbar G and the pin G' from which pilot valve E is suspended, and thus gives the valve E a closing adjustment. The last mentioned adjustment of the valve E, effects another increase in the pilot valve output pressure. Said output pressure increase is transmitted through the pipe I² to the chamber J, and to the restriction R', and hence is slowly transmitted to the chamber K. The expansion of the chamber K thus produced is a positive feed-back or reset action. Each increment of the retarded pressure increase in the pipe IA is transmitted without delay to the chamber K. Said retarded pressure increase also results in a further retarded increase in the pressure in the chamber L, due to the leakage flow through the flow restricting device R''.

Figure 2:
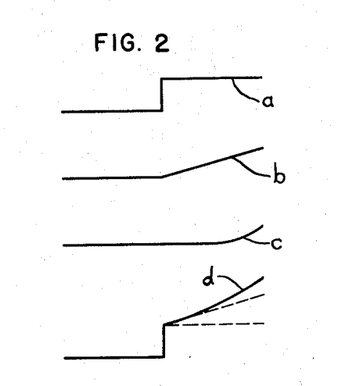
Fig. 2 is a diagram including curves illustrating different components of the response of the apparatus shown in Fig. 1 to a change in the controlled variable.

The character and relation of the control responses of the apparatus shown in Fig. 1 initiated by a sudden drop in the thermometer bulb temperature are graphically illustrated by the curves included in Fig. 2. In that figure, the curve $a$ indicates the proportional response produced when a sudden drop in the thermometer bulb temperature results in a sudden increase in the pressure in the nozzle F, followed by the elimination of a portion of that pressure increase as a result of the negative feed-back or follow-up adjustment given the flapper valve E. The resultant of the initial increase and subsequent smaller decrease in the nozzle pressure, is represented by the vertical portion of the curve $a$. The positive feed-back, or reset, adjustment of the nozzle pressure due to the slow flow of air past the restriction R' into the pipe IA and thence into the chamber K, is represented by the straight upwardly inclined portion of the curve $b$. The second integral response, due to the slow flow of air from the pipe IA into the chamber L through the flow restricting device R'' results in a delayed further increase in the pressure in the nozzle F which is indicated by the concave upwardly inclined portion of the curve $c$ of Fig. 2. The second integral pressure change shown by the curve $c$, progressively increases in magnitude as the pressure in the chamber L builds up to equality with the pressure in the chamber K. The collective effect of the three control responses on the pressure in the bleed nozzle F is represented by the curve $d$, which is produced by superposing the curves $b$ and $c$ on the curve $a$.

As will be apparent, operation results which are the converse of those just described, occur when the initial change in the thermometer bulb temperature is an increase. In such case the follow-up, reset and second integral responses, all contribute to a reduction in the pressure in the bleed nozzle F.

The characteristic operation of the control mechanism shown in Fig. 1 may be expressed by the following equation:

$$-P=\frac{r'r''}{s}\int_0^t\int_0^t \theta dt\, dt + \frac{r'}{s}\int_0^t \theta dt + \frac{1}{s}\theta$$

The symbols used in the foregoing equation designate quantities as follows:

P designates pilot valve output pressure or it may be assumed to designate the regulator position which varies with the output pressure;

$\theta$ designates the deviation of the thermometer bulb temperature from its normal value;

$t$ designates time;

$r'$ designates reset rate;

$r''$ designates second integral rate; and $s$ designates the proportional band or throttling range of the Fig. 1 apparatus.

Figure 3:
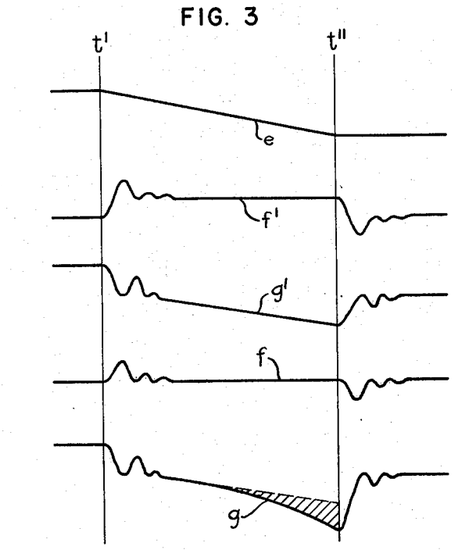
Fig. 3 is a diagram including curves illustrating the effect of the second integral response during a gradual change in process load, obtainable with the apparatus shown in Fig. 1.

The attainment of practically important advantages by the inclusion in Fig. 1 of means for effecting the second integral control response, is made apparent by the curves included in the diagram Fig. 3. In Fig. 3, the curve $e$ represents a gradual decrease in the process load occurring during the time interval starting at the instant represented by the vertical time line $t'$, and ending at the instant indicated by the vertical time line $t''$. Such a load decrease in the case of a heater, might result from a decrease in the amount of water or metal having its temperature increased during the interval represented by the horizontal distance between the line $t'$ and $t''$ of Fig. 3, or it might result, in some cases, from a substantial increase in the temperature of the ambient atmosphere and resultant reduction in the radiation heat losses of the heater. In Fig. 3, the curves $f$ and $g$ represent changes in the temperature of the bulb A and in the adjustment position, or effective flow capacity, of the regulator valve B, respectively, which are produced as a result of the load change represented by the curve $e$ when the regulator B is controlled as contemplated in Fig. 1. To better illustrate the effect of the second integral response, Fig. 3 includes curves $f'$ and $g'$ which represent the values of the thermometer bulb temperature and the corresponding flow capacity of the regulator B, which would exist with the apparatus shown in Fig. 1 if the second integral response were omitted.

When the furnace load continuously decreases during the time period $t'$—$t^2$ as indicated by the curve $e$, an initial effect of the gradual load decrease is an abrupt initial decrease in the thermometer bulb temperature. With the proportional, reset control as is indicated by the curve $f'$, the abrupt initial increase in the thermometer bulb temperature will be quickly checked and after slight oscillation said temperature will be held substantially constant at a value higher than the normal or control point temperature while the load continues to decrease. When the process load ceases to decrease, the thermometer bulb temperature falls quite abruptly to a value about equal to the normal or control point value, and then after a slight fluctuation smooths out and becomes constant at the control point value.

The controlled variable curve $f$, actually obtainable with the apparatus shown in Fig. 1, is analogous in form to the curve $f'$, but differs from the latter in that the smoothed out horizontal portion of the curve $f$ between the time lines $t'$ and $t''$ is at the control point value instead of being above that value as it is in the curve $f'$. When the process load ceases to diminish, the thermometer temperature shown by the curve $f$, drops rather abruptly but quickly rises again and after a little oscillation smooths out and becomes constant at the control point value of the thermometer temperature.

With proportional and reset responses, and no second integral response, the pilot valve output pressure, and consequently the extent to which the regulator valve B, is open, rapidly diminishes during a short initial portion of the time interval $t'$—$t''$, as is indicated by the portion of the curve $g'$ adjacent and at the right of the line $t'$. Then, after a little fluctuation said output pressure, and the extent of regulator valve opening, proceed to diminish at a substantially constant rate, as is indicated by the substantially downwardly included portion of the curve $g'$. Said inclination of the curve $g'$ corresponds generally to the inclination of the load curve $e$ during the same period. Following the instant at which the heater load is assumed to again become constant, the pilot valve output pressure, shown by the curve $g'$, abruptly increases and after some oscillation smooths out and becomes horizontal, but at a value which is lower than the pilot valve pressure at the instant $t'$, by an amount depending on the magnitude of the decrease in the furnace load.

As the curve $g$ of the Fig. 3 diagram indicates, the output pressure, including the second integral component, which the Fig. 1 apparatus is adapted to develop, decreases during the time period $t'$—$t''$. During the initial portion of the period, the output pressure fluctuates, but during the subsequent and major portion of the period the output pressure diminishes at a progressively increasing rate. As a comparison of the curve $g$ and $g'$ indicates, there is relatively little difference between the pressure shown by the two curves during an initial portion of the period $t'$—$t''$, but during the final portion of the period, the output pressure shown by the curve $g$ progressively diminishes below the pressure shown by the curve $g'$, as is made clearly apparent by the shading lines above the curve $g$. Following the instant at which the heater load ceases to decrease, the pressure shown by the curve $g$ rapidly increases and then after some fluctuation, smooths out to a constant value shown by the right hand horizontal portion of the curve $g$.

The final constant valves of the output pressures shown by the two curves $g$ and $g'$ are equal and similarly below the equal initial constant pressures shown by the horizontal left end portions of said curves. It is to be noted, however, that the new constant value of the output pressure, is attained more quickly with the control operation including the second integral response and illustrated by the curve $g$, than with the control operation not including the second integral response and illustrated by the curve $g'$. As Fig. 3 plainly indicates, with a gradual load change of the character shown by the curve $e$, the addition of a second integral control response component to the proportional and reset control responses increases the extent of the corrective adjustment of the pilot valve output pressure effective on a given change in process load, and reduces the average extent of departure of the controlled variable from its normal value.

Figure 4:
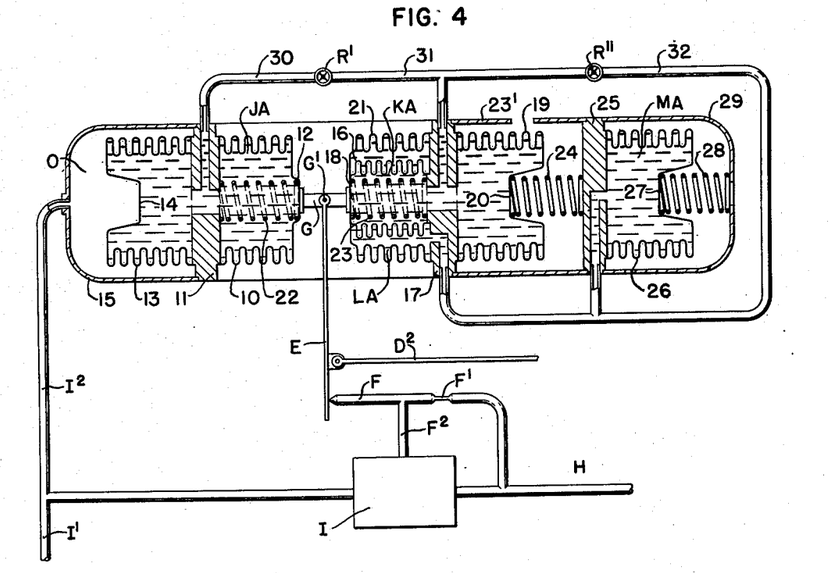
Fig. 4 is a diagrammatic representation of control apparatus containing liquid filled, follow up, reset and second integral pressure chambers.

In Fig. 4 I have illustrated a modification of the apparatus shown in Fig. 1, in which the follow-up reset and second integral response expansible pressure chamber, JA, KA and LA, respectively, form part of a liquid containing system, and differ in form from the pressure chambers J, K and L, respectively, of Fig. 1. As shown in Fig. 4, the chamber JA comprises coaxial portions at the right and left, respectively, of a stationary supporting wall member 11. The portion of the chamber JA at the right of the wall 11 is surrounded by a corrugated tubular bellows body 10 having one end secured to the member 11 and having its other end secured to a movable end wall 12, to which one end of the cross-bar G is connected. The member 11 is formed with a central aperture through which the portions of the chamber JA at the opposite sides of the member 11 are in free communication. The portion of the chamber JA at the left of the member 11 includes a corrugated tubular bellows body 13 connected at one end to the member 11 and connected at its other end to a movable end wall 14.

The tubular bellows element 13 with its end wall 14, is located within a cup-shaped casing member 15 having its rim portion connected to the stationary member 11. The space within the casing member 15 and external to the left hand portion of the chamber JA, forms an expansible air chamber O to which the output pressure of the pilot valve I of Fig. 4 is transmitted by the pipe I². The air pressure in the chamber O is transmitted to the liquid in the chamber JA by the movable wall formed by the bellows element 13 and end wall 14. For the purpose of the present invention, the resiliency of the bellows element 13 should not be of a character to prevent substantial equality between the fluid pressures in the chambers O and JA.

The expansible chamber KA comprises portions at opposite sides of a stationary support or wall member 17 formed with a central aperture through which said portions are in free communication. The portion of the chamber KA at the left of the support 17 is surrounded by a corrugated tubular bellows body 16, having one end secured to the member 17 and having its other end secured to a movable end wall 18 facing the movable end wall 12 of chamber JA, and to which the right-hand end of the rod G is connected. The portion of the chamber KA at the right of the member 17 comprises a corrugated tubular bellows body 19, larger in diameter than the bellows body 16, and having one end attached to the member 17 and having its other end secured to a movable end wall 20. The expansible chamber LA comprises the inter-bellows space between the bellows body 16 and a coaxial larger corrugated tubular bellows body 21 which has one end secured to the member 17 and has its other end secured to the peripheral portion of the movable end wall 18.

The end walls 12 and 18 and the connecting rod G are biased to normal positions, ordinarily in part by the resiliency of the spring metallic walls of the corrugated bellows bodies 10, 16 and 21, but largely by the bias springs 22 and 23. The spring 22 acts between the member 11 and the end wall 12, while the spring 23 acts between the end wall 18 and the member 17. The bellows body 19 surrounding the right hand portion of the chamber KA, is shown as surrounded by protective casing 23 which does not form a pressure chamber wall, as it is formed with a port or ports through which the space within the casing 23' and surrounding the bellows element 19 is in free communication with the atmosphere. However, the movable end wall 20 is biased to the left by a helical compression spring acting between the wall 20 and a stationary wall member 25 parallel to and displaced to the right from the member 17.

An expansible, liquid filled reservoir space or chamber MA is surrounded by a tubular bellows body 26 at the right side of the wall member 25. One end of the bellows body 26 is connected to the member 25 and its other end is connected to a movable end wall 27. The reservoir chamber MA which serves the general purpose of the reservoir M of Fig. 1, is given a collapsing tendency by a spiral spring 28 acting between the movable wall 27 and the end wall of a rigid casing element 29 which forms a protective casing about the chamber MA, and is ported so that the outer surface of the bellows 26 and end wall 27 are exposed to atmospheric pressure. The chamber MA thus allows a change of pressure to be effected in chamber LA proportional to the amount of liquid passing into from pipe 32, notwithstanding the fact that the liquid is incompressible.

The controller shown in Fig. 4 may be, and as shown is, connected in a control system identical with that illustrated by way of example in Fig. 1. Thus, in Fig. 4, the flapper valve E is adjusted by longitudinal movements of the link D² and of the rod or cross bar G, to control the air pressure in a bleed nozzle F associated with a pilot valve I, having its output pressure transmitted by a pipe I² to the air filled pressure chamber O at the left of the liquid filled chamber JA.

The liquid chambers JA and KA are in communication by means comprising a pipe 30 having one end connected to the chamber JA, a pipe 31 having one end connected to the chamber KA, and the flow restricting device R' which connects the second ends of the pipe sections 30 and 31. The pipe 31 is connected to a pipe 32 by the flow restricting device R'', and the pipe 32 is connected to the second integral chamber LA and to the reservoir chamber MA. As previously indicated, the general operation of the apparatus shown in Fig. 4 may be identical with that of the apparatus shown in Fig. 1.

Figure 5:
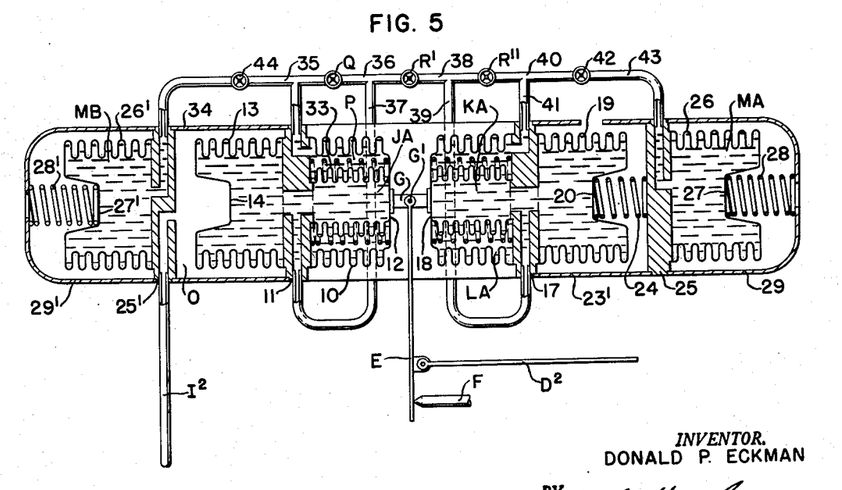
Fig. 5 is a diagrammatic representation of a controller differing from that shown in Fig. 4 by its inclusion of a rate response chamber.

In Fig. 5 I have illustrated a modification of the apparatus shown in Fig. 4 consisting essentially in the addition to the apparatus shown in Fig. 4 of means for obtaining rate responses in addition to the proportional and reset responses obtainable alike with the apparatus of Fig. 4 and that of Fig. 5. The controller shown in Fig. 5 differs structurally from the controller shown in Fig. 4 in that a bellows 33, smaller in diameter than the bellows 10, is located in the space surrounded by the latter, and has its ends attached, one to the stationary member 11 and the other to the movable end wall 12. The pressure chamber P thus formed between the bellows elements 10 and 33, serves a rate response purpose, as is hereinafter explained. The apparatus shown in Fig. 5 also differs from that shown in Fig. 4 in the addition to the left end of the controller of an expansible reservoir MB comprising structural parts 25', 26', 27', 28' and 29', corresponding respectively to the parts 25, 26, 27, 28 and 29 of the reservoir chamber MA shown at the right end of the controller of Fig. 5, and of the controller MA of Fig. 4. In Fig. 5, also the cup-shaped casing element 15 of Fig. 4 is replaced by a cylindrical casing part 34 having one end attached to the stationary member 11 and the other end attached to the member 25'.

Figs. 4 and 5 also differ in respect to their pipe connections. The piping connected to the different liquid filled pressure chambers JA, P, KA, LA, MA and MB of the apparatus shown in Fig. 5, includes a pipe 35 which connects the rate response chamber P to the reservoir MB, and an adjustable flow restricting device Q which connects the pipe 35 to a pipe 36. The latter extends between the flow restricting devices Q and R' and is connected through a branch 37 to the chamber JA. The device R' connects pipe 36 to a pipe 38 extending between the device R' and a flow restricting device R'', and having a branch 39 connected to the chamber KA. The pipe 38 is connected through the flow restricting device R'' to a pipe 40. The latter extends between the device R'' and a normally open cut-off valve 42, and has a branch 41 connected to the second integral chamber LA. The pipe 38 is connected through the valve 42 to a pipe 43 which extends from said valve to the reservoir chamber MA. With the valve 42 open, the chambers LA and MA are in free communication, and the chamber MA reduces the rate at which leakage through the restriction R'' changes the pressure in the chamber LA. When the valve 42 is closed, the operative effect of the reservoir MA is eliminated, and the apparatus then operates just as it would if the reservoir MA were non-existent. As shown, the pipe 35 includes a normally open valve 44 which, when closed, makes the reservoir chamber MB totally inoperative.

The equation for the controller shown in Fig. 5 differs from the equation set forth above for the controller shown in Fig. 1 only in that its right hand branch includes an additional term $$\frac{q}{s}\frac{d\theta}{dt}$$

In that term, the symbols $s$, $\theta$ and $t$ mean throttling range, deviation from control point value and time, respectively, as previously stated, and the symbol $q$, not previously defined, designates the rate time of the controller. The term thus included in the equation for the controller of Fig. 5, and not included in the equation for the controller shown in Fig. 1, is a positive quantity. Its presence in the equation is indicative of the fact that the rate response obtained with the controller shown in Fig. 5 increases the corrective action which the controllers shown in Figs. 1 and 4 would make in response to the same deviation $\theta$, of the controlled variable from its normal value. That increase in the overall corrective effect is a direct result of segregating the chamber P from the right hand portion of the chamber JA, and the connection of the chamber P to the chamber JA through the flow restricting device Q. In consequence, on a change in the controlled variable and a corresponding change in the air pressure in the chamber O, the follow-up movement of the end wall 12 is retarded and is not completed until leakage past the restriction Q equalizes the pressure in the chamber P with the pressure in the chamber JA. As those skilled in the art will understand, the operative effect of such a retardation of a follow-up action is a rate response.

While other means for obtaining rate response are known, the means for that purpose shown in Fig. 5 are believed to be novel and are adapted for use in air controllers differing in their operative characteristics from the controller shown in Fig. 5. Thus for example, if the flow restricting device R'' of Fig. 5 were given a wide open adjustment, so that the pressures in the chambers KA and LA were equal at all times, the controller shown in Fig. 5 would be rendered inoperative to produce a second integral response. It would still be fully operative, however, to produce proportional reset and rate responses on a variation in the controlled variable.

Figure 6:
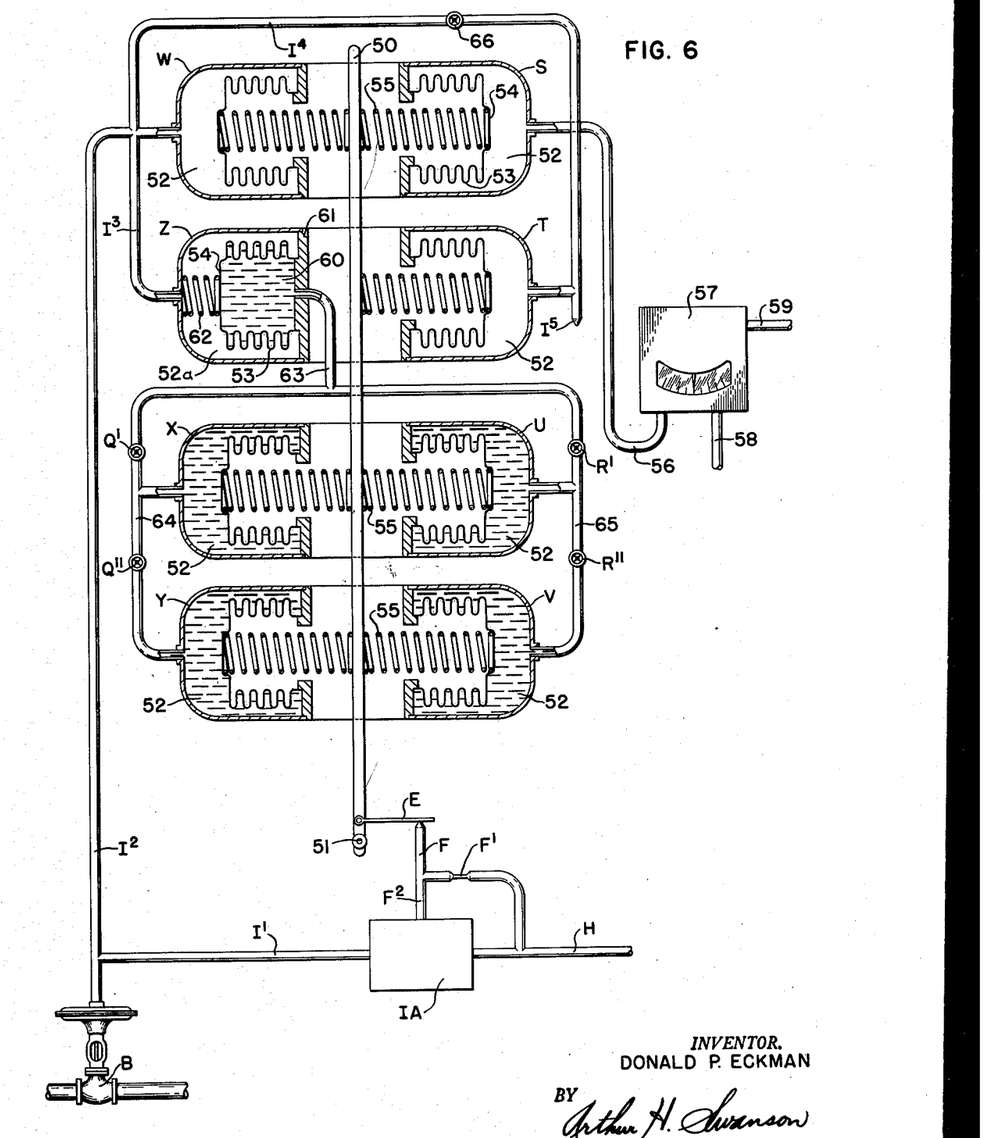
Fig. 6 is a diagrammatic representation of a control system including air containing pressure chambers for producing follow-up actions with a variable throttling range, and liquid containing pressure chambers for developing reset, second integral, rate and derivative responses, and means for adjusting a single flapper or bleed valve in accordance with said responses.

Fig. 6 illustrates a form of the present invention comprising a controller effecting an ultimate control action dependent on the resultant of forces proportional to five different control responses or functions which are produced on, and as a result of a change in the value of the controlled variable. The apparatus diagrammatically illustrated in Fig. 6 comprises a flapper valve E, bleed nozzle F, flow restriction F', air supply pipe H and connection F² between the nozzle F and a pilot valve IA, as shown in Fig. 1. The flapper valve E of Fig. 6 is supported by a beam or lever arm 50 mounted to turn about a pivot or fulcrum 51. One end of the flexible flapper valve E is rigidly secured to the arm 50 adjacent the pivot or fulcrum 51. The output pressure from the pilot valve IA is transmitted by a pipe I' to a regulator B, and by a pipe I² to pressure chambers operatively associated with the flapper valve E. In the arrangement shown in Fig. 6, however, the pilot valve IA is of a known type which differs from the pilot valve I in that the bleed nozzle and pilot valve output pressures of the pilot valve IA, are inversely related, i. e., the pilot valve output pressure increases or decreases as a result of a decrease or increase, respectively, in the pressure in the nozzle F. It is to be noted, however, that if the nozzle F and flapper valve E were located at the left instead of at the right of the pivot 51, the pilot valve IA could be of the type in which the output pressure varies in direct proportion to the input pressure transmitted to it through the nozzle connection $F^2$.

The lever arm 50 is subjected to separate torque forces tending to turn the arm counter-clockwise, by fluid pressure devices S, T, U and V at the right side of the arm, and arranged to act on the latter at progressively diminishing distances from the fulcrum 51. The arm 50 is also subjected to separate torque forces tending to turn the arm clockwise by fluid pressure devices W, X and Y located at the left of the arm 50 and acting on the latter at progressively diminishing distances from the fulcrum 51. As shown, the devices S, T, U, V, W, X and Y are all alike, each comprising a rigid casing enclosing a corresponding pressure chamber 52, and forming a major portion of the wall for said chamber. However, said chamber has a movable wall portion at the side of the chamber adjacent the arm 50. As shown, the movable wall portion of each of said pressure devices comprises a tubular bellows element 53 extending into the space surrounded by the rigid portion of the casing wall and having its outer end portion attached to said rigid wall portion, and having its inner end connected to, and closed by a movable end wall 54. The movable wall of each pressure chamber 52 acts on the lever arm 50 through a corresponding helical compression spring 55 which acts between the chamber end wall 54 and the adjacent edge of the lever 50. As shown, the pressure devices W, X and Y directly face the devices S, U and V, respectively, but this relationship is not essential.

The pilot valve output pressure is transmitted directly to the pressure chamber 52 of the device W, and, as is hereinafter explained, said output pressure also regulates the pressures maintained in the pressure chamber 52 of each of the pressure devices T, U, V, X and Y. The output pressure is controlled by a controlling air pressure transmitted to the chamber 52 of the pressure device S through the pipe 56, and in any suitably prolonged stable operating condition of the controller, the output pressure is in a predetermined proportion to the pressure in the pipe 56. In the form of the apparatus shown in Fig. 6, the pressure transmitted to the chamber S is the output pressure of a pneumatic transmitter 57 of well known commercial type, which is connected to a source of air under pressure by a pipe 58, and is automatically operative to maintain an output pressure in the pipe 56 which is in predetermined proportion to the magnitude of a controlling force impressed on the transmitter 57 as by means of a conduit or cable 59.

As those skilled in the art understand, the controlling force impressed on such a transmitter may vary widely in character and origin. For the purpose of the present invention, the control force impressed on the transmitter 57 may be a function of any controlled variable subject to corrective regulation by the adjustment of the valve B, or other regulator element capable of adjustment in response to variations in the output pressure of the pilot valve IA. For example, the control force may be a fluid pressure indicative of a temperature, liquid level, fluid density, or the like, or it may be an electric force such as a voltage or current, or it may be a tension, torque, or other mechanical force.

The chambers 52 of the pressure devices U, V, X and Y form parts of a liquid filled system to which the output pressure of the pilot valve IA is transmitted through a liquid seal element Z. The latter is shown as comprising a chamber $52a$ in a casing structure identical with the casing structure of each of the devices S, T, etc., except that the space 60 which is surrounded by the tubular element 53, is closed at its outer end by a rigid wall part 61 forming part of the rigid casing structure of the device Z. The output pressure of the pilot valve IA is transmitted to the chamber $52a$ of the device Z through the pipe $I^2$ and branch pipe $I^3$. The air pressure in the chamber $52a$ is transmitted to the liquid in the chamber 60 through the bellows element 53 and end wall 54. The pressure thus transmitted to the liquid may be slightly augmented by the action of a compression spring 62 in the chamber $52a$ and acting between the corresponding wall 54 and the juxtaposed portion of the rigid casing wall. The movable wall portion and spring 62 of the device Z, accommodate the changes in volume due to thermal expansion and contraction of the liquid in the liquid filled system. The spring 62 also serves the further purpose of preventing undue expansion of the bellows element 53 of the device T during periods in which the air pressure in the chamber $52a$ is below its normal pressure range.

The liquid pressure in the chamber 60 is transmitted through piping 63 and a regulable flow restricting device Q′ to a pipe 64, and is transmitted through another branch of the piping 63 and a flow restricting device R′ to a pipe 65. Pipe 64 is directly connected to the chamber 52 of the pressure device X, and is connected through a regulable flow restricting device Q″ to the chamber 52 of the device Y. The pressure in the pipe 65 is directly transmitted to the chamber 52 of the pressure device U, and is transmitted through a regulable flow restricting device R″ to the chamber of the pressure device V. Each of the devices Q′, Q″, R′ and R″ may well be a needle valve.

The pilot valve output pipe $I^2$ is connected through a branch pipe $I^4$ including a regulable flow restricting device 66, to the chamber 52 of the pressure device T. At the discharge side of the device 66, the pipe $I^4$ is in communication with the atmosphere through a bleed orifice $I^5$. In consequence, whenever the pilot valve output pressure in the pipe $I^2$ exceeds the pressure of the atmosphere, as it always does in normal operation, there is a leakage flow of air past the device 66, and a corresponding pressure drop in the device 66. In normal operation, therefore, the pressure in the chamber 52 of the device T is always intermediate the pressure of the atmosphere and the pilot valve output pressure. It may be increased or decreased by giving the valve 66 opening and closing adjustments, and with any given adjustment of the device 66, an increase in the output increases the pressure at the outlet side of the valve 66.

In any extended period of stable operation in which the adjustment of the regulator B is that required to maintain a constant pressure in the pipe 56, the pressure in the chamber 52 of the device S will fix, and be in predetermined relation to, the pressure in the other pressure chamber 52.

Under any suitably prolonged stable operating condition with the controlled variable at its control point value, the pressures in the chambers 52 of the devices U, V, X and Y will become equal to the pressure in the chamber 52 of the device W, except for such minor differences as may result from differences in elevation of different portions of the liquid filled system, and the normally insignificant effect on the liquid pressure of the resilient forces due to the spring 62 and the resiliency of the bellows element of the device Z. When following a prolonged period of stable operation, the pressure transmitted to the controller pressure device S by the pipe 56 is varied, the torque force transmitted by the spring 55 of the device S to the lever arm 50 is correspondingly varied and effects an angular adjustment of the lever arm. That adjustment modifies the pressure maintained in the nozzle F by varying the position of the flapper valve E. Thus, for example, on an increase in the pressure transmitted by the pipe 56 to the pressure device S, the lever arm 50 is given a counter-clockwise adjustment. Such movement of the arm 50 moves the flapper valve E away from the nozzle F and reduces the nozzle pressure. With the pilot valve IA operating inversely as previously described, the decrease in the pressure in the nozzle F results in an increase in the pilot valve output pressure which is transmitted to the chamber 52 of the pressure device W. The last mentioned chamber is thereby expanded and gives the lever arm 50 a negative feed-back or follow-up adjustment in the clockwise direction. The clockwise adjustment increases the pressure in the nozzle F and thus eliminates a part of the previous increase in the pilot valve output pressure. The extent of the original follow-up adjustment is directly dependent upon the pressure change in the chamber 52 of the device T which results from a change in the pilot valve output pressure transmitted to the device W.

Thus with the pressure devices W and T arranged as shown in Fig. 6, the adjustment of the flow restricting device 66 varies the throttling range, or proportional band, of the controller. The device T and associated means for regulating the pressure in the chamber 52 of the device T, thus constitute a proportional band or throttling range, regulator, disclosed and claimed in my co-pending application filed of even date herewith, Serial No. 786,245.

The pilot valve output pressure transmitted to the liquid seal device Z and transmitted therefrom to the different liquid filled chambers U, V, X and Y through the flow restricting devices respectively associated with the first mentioned devices, renders the latter operative to serve different, definite control purposes. Thus the device X provides a rate response since it tends to augment, and retards the completion of the follow-up action to which the lever arm 50 is subjected, following an initial change in the control pressure transmitted to the device S. The follow-up delay action or rate time of the device X depends upon the adjustment of the flow restricting device Q', which, like all of the other flow restricting devices mentioned herein, may well be, and ordinarily is a needle valve.

The pressure to which the device X is subjected, is transmitted through the flow restricting device Q'' to the pressure device Y, and through the latter tends to augment, and additionally delays, the completion of the follow-up action to which the lever arm 50 and flapper valve E are subjected following an initial change in the control pressure transmitted to the device S. The change in the pressure transmitted to the device Y depends upon and is a derivative of the rate of change of the pressure transmitted to the device X.

The rate response obtained with the device X provides a control action correcting for the rate of change of the controlled variable, i. e., for the rate of change of the control pressure transmitted to the device S. The rate of change of the pressure transmitted to the device Y provides, a control action which provides assistance in keeping the proportional band suitably narrow and the reset rate suitably rapid, which the effect of the second integral control action may make desirable. The derivative response also aids in the effective control of a process where rapid changes due to multiple capacities occur. The retarded pressure change transmitted to the chamber U from the pilot valve output pressure pipe I² through the seal device Z and flow restricting device R', produces a positive feed-back or reset action on the lever 50 which eliminates a portion of the follow-up effect of the device W on the position of the lever arm 50. The rate at which the device U thus operates to increase or decrease the output pressure of the pilot valve IA following an initial increase or decrease in the control pressure transmitted to the device S, i. e., the reset rate, depends on the adjustment of the flow restricting device R'. The reset device U provides control actions correcting for the effects of variations in the magnitude of the process load, i. e., for variations in the rate of fuel supply required to maintain the thermometer bulb temperature at its control point value. The transmission of the reset pressure from the pipe 65 to the pressure device V through the flow restricting device R'', provides a double integral response which corrects for variations in the rate of change of the process load change.

While the effect of the reset device U is to correct for variations in the magnitude of the process load change, the follow-up or proportional control action of the devices W and T provides a control action which corrects for variations in the magnitude of the control pressure transmitted to the device S, i. e., for variations in the controlled variable of which the control pressure is a measure.

The character of the described operating characteristics of the controller shown in Fig. 6 is indicated by the following equation for that controller:

$$-P = \frac{r'r''}{s}\int_0^t\int_0^t \theta dt dt + \frac{r'}{s}\int \theta dt + \frac{1}{s}\theta + \frac{q}{s}\frac{d\theta}{dt} + \frac{qq'}{s}\frac{d^2\theta}{dt^2}$$

The foregoing equation differs from the previously stated equation for the controller shown in Fig. 1, by the inclusion of the last two terms. The first of those terms, $$\frac{q}{s}\frac{d\theta}{dt}$$

is indicative of the fact that the rate response obtained with the controller shown in Fig. 6 increases the corrective action which the controller shown in Fig. 1 or in Fig. 4 would make in response to the same deviation, $\theta$, of the controlled variable from its normal value, as was explained above in connection with the controller shown in Fig. 5. The second term found in the last stated equation and not in the first stated equation, namely, $$\frac{qq'}{s}\frac{d^2\theta}{dt^2}$$

is indicative of the fact that the action of the pressure device Y augments the effect on the lever arm 50 of the pressure devices W and X, resulting from an initial change in the pilot valve output pressure, and indicates also that the operative effect of the device Y is proportional to the second differential of the deviation, θ, i. e., is proportional to the rate of change of the rate of change of said deviation. In said term, the element q' designates the effect of the flow retarding action of the valve R" of Fig. 6.

The means for effecting the multiple control functions obtainable with the apparatus shown in Fig. 6, are advantageously combined in a relay mechanism of the character shown diagrammatically in Fig. 6, rather than in a single control unit, because the inclusion of the combination in the relay contributes to simplicity of construction.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. An air controller comprising in combination first, second and third expansible, fluid containing chambers each having walls including a movable wall, means mechanically connecting the movable wall of each of said chambers to the movable wall of each of the other chambers, said walls and connecting means being so arranged that the expansion and contraction of the first chamber subjects the movable wall of each of the other chambers to a force tending to respectively contract and expand said chambers, valve means for maintaining a controlling fluid pressure in said first chamber comprising a bleed nozzle in restricted communication with a source of air under pressure and a valve connected to, and adjusted relative to said nozzle by the movements of said movable walls, and varying the air pressure in said nozzle in accordance with its adjustment relative to said nozzle, and means for varying the pressure in said first chamber in proportion to changes in said nozzle pressure, means through which changes in the first chamber pressure effects retarded pressure changes in the second and third chambers, comprising pressure transmitting means including a retarding device connecting said first and second chambers and pressure transmitting means including a retarding device connecting said second and third chambers, means responsive to variations in the value of a controlled variable for effecting an initial adjustment of said valve means on a change in said value and thereby increasing or decreasing the pressure in said first chamber accordingly as said change in value is in one direction or in the opposite direction, and means jointly responsive to the pressures in said chambers for effecting further adjustments of said valve means on changes in the pressures in said chambers, and thereby effecting a negative feed-back variation in the pressure in said first chamber following said initial adjustment of said valve and effecting subsequent reset and second integral positive feed-back variations in the pressures in the first chamber on changes in the pressures in said second and third chambers.

2. An air controller as specified in claim 1, in which said first, second and third chambers are air filled.

3. An air controller as specified in claim 1, in which said first, second and third chambers are liquid filled and in which said first chamber has a second movable wall and in which said controller includes an air chamber separated by said second movable wall from said first chamber, and in which the pressure in said first chamber is varied by varying the pressure in said air chamber in proportion to changes in the pressure in said nozzle.

4. An air controller as specified in claim 1, including means providing a rate control response and comprising a fourth expansible, fluid containing chamber having a movable wall mechanically connected to the movable walls of said second and third chambers and arranged to expand and contract as said second and third chambers respectively contract and expand, and means through which pressure changes in said first chamber effect retarded pressure changes in said fourth chamber.

5. An air controller as specified in claim 4 in which one of said first and fourth chambers is annular and surrounds a portion, at least of the other.

6. An air controller as specified in claim 1, in which said chambers are substantially coaxial and in which one of said second and third chambers is annular and surrounds a portion, at least, of the other.

7. An air controller as specified in claim 6, which includes a fourth expansible fluid chamber and in which one of said first and fourth chambers is annular and surrounds a portion, at least, of the other, and in which said controller includes means through which changes in the first chamber pressure effects retarded pressure changes in said fourth chamber.

8. An air controller comprising first, second, third and rate expansible fluid pressure chambers each having walls including a movable wall, the movable walls of the first and rate chambers being portions of one rigid wall member, and the movable walls of said second and third chambers being portions of a second rigid wall member in juxtaposed relation to the first mentioned wall member, said wall members being mechanically connected so that the expansion and contraction of said first chamber is attended by the expansion and contraction of said rate chamber, respectively, and by the contraction and expansion of said second and third chambers, respectively, means providing a restricted flow passage between said first and second chambers, means providing a restricted flow passage between said second and third chambers, means providing a restricted flow passage between said first and rate chambers, valve means for maintaining a variable control pressure in said first chamber, valve operating means responsive to variations in the value of a controlled variable for effecting an initial adjustment of said valve means to vary the pressure in said first chamber on, and in accordance with a change in said value, and means through which the movement of said mechanically connected walls adjust said valve means to effect follow-up, rate, reset and second integral responses as the pressures in said chambers vary following said initial adjustment of said valve means.

9. An air controller as specified in claim 8, in which said chambers are substantially coaxial, and in which one of the chambers of each pair having movable wall portions forming a part of the same rigid wall member, is annular and surrounds a portion, at least, of the other chamber of the pair.

10. An air controller for producing a plurality of control responses to a variation in the value of a controlled variable, comprising in combination a lever arm pivoted to turn about a fulcrum axis, a flapper valve adjusted by an angular adjustment of said arm, a cooperating bleed nozzle having a bleed orifice variable throttled by said valve as said arm turns through a small range of angular movement, a control pressure device at one side of said arm, a follow-up pressure device at the other side of said arm, and at least one other pressure device at each side of said arm, and each including an expansible chamber, each of said pressure devices having a movable wall facing said arm and a separate helical spring acting between said movable wall and the adjacent edge of said arm, whereby each of said devices at one side of the lever subjects the latter to a torque force opposing the torque forces to which the lever arm is subjected by the pressure devices at the opposite sides of the arm, means for maintaining a fluid pressure in the pressure chamber of said control device which varies in accordance with variations in the value of a controlled variable, means for maintaining a pressure proportional to the nozzle pressure in the pressure chamber of said follow up pressure device, and restricted conduit connections for transmitting the pressure changes in said follow-up device to each of said other devices.

11. Control apparatus as specified in claim 10, including a pressure device at the opposite side of the lever from the follow-up pressure chamber and having its pressure chamber connected to the atmosphere through a bleed orifice and connected to the pressure chamber of the follow-up device through an adjustable flow restricting device which by its adjustment is adapted to vary the throttling range of the apparatus.

12. An air controller for producing a plurality of control responses on variations in the value of a controlled variable comprising in combination, a lever pivoted to turn about a fulcrum axis, a bleed nozzle connected to a source of air under pressure and having a bleed orifice, a flapper valve connected to said lever for adjustment to variably throttle the flow through said orifice as said lever turns through a small range of angular movements, first and second pressure devices and a plurality of other pressure devices, each of said pressure devices comprising a pressure chamber having a stationary rigid wall portion and a movable wall portion toward and away from which an adjacent portion of said lever moves as it turns about said pivot, a separate helical spring extending between the movable wall of each of said devices and the adjacent portion of said lever and subjecting the latter to a torque force varying with the pressure in the corresponding pressure chamber, said devices and lever being so relatively arranged that the torque forces impressed on the lever by said first pressure device and by one or more of said other pressure devices oppose the torque forces impressed on the lever by said second pressure device and by one or more of said other pressure devices, means for maintaining a fluid pressure in the pressure chamber of the first device which varies in accordance with variations in the value of a controlled variable, means for maintaining a pressure proportional to the nozzle pressure in the pressure chamber of said second device, and restricted conduit connections for transmitting the pressure changes in the pressure chambers of said second device to the pressure chambers of each of said other pressure devices.

13. An air controller as specified in claim 1, in which the pressure chamber of said second device contains air under pressure and in which the pressure chambers of a plurality of said other devices are filled with liquid and in which the means for transmitting to the last mentioned pressure chambers the pressure in the pressure chamber of the first device comprise a liquid seal including a movable partition wall separating an air chamber and a liquid chamber, respectively connected to the chamber of said second device and said liquid filled pressure chambers.

14. An air controller comprising first, second, third and fourth expansible, fluid containing chambers each having walls including a movable wall, means mechanically connecting a movable wall of each of said chambers to a movable wall of each of the other chambers, said walls and connecting means being so arranged that the first and second chambers simultaneously expand and simultaneously contract, and thereby subject the movable walls of the third and fourth chambers to force tending respectively to simultaneously contract and to simultaneously expand said third and fourth chambers, valve means adjustable to maintain a variable control pressure in said first chamber, means including a first adjustable throttling device forming an adjustable flow passage between said first and second chambers, means including a second adjustable throttling device forming an adjustable flow passage between said third and fourth chambers, valve operating means responsive to variation in the value of a controlled variable for effecting an initial adjustment of said valve means to thereby change the pressure in said first chamber on and in accordance with a change in said value and means through which the movements of said mechanically connected walls following and produced by said change in the first chamber pressure adjust said valve means in accordance with the related pressure changes thereby made in the pressure in the different chambers, whereby said walls effect follow-up, rate and reset responses when the adjustments of said throttling devices are such as to restrict flow through the first mentioned passage and to permit free flow through the second mentioned passage, and whereby said walls adjust said valve means to effect follow-up, reset and second integral responses when the adjustments of said throttling devices are such as to permit free flow through the first mentioned passage and to restrict flow through the second mentioned flow passage.

DONALD P. ECKMAN.

REFERENCES CITED

The following references are of record in the file of this patent:

UNITED STATES PATENTS

| Number | Name | Date |
| --- | --- | --- |
| 2,285,540 | Stein et al. | June 9, 1942 |
| 2,360,889 | Philbrick | Oct. 24, 1944 |